United States Patent
Garcia

(10) Patent No.: US 6,933,924 B2
(45) Date of Patent: Aug. 23, 2005

(54) ENHANCED COMPUTER PERIPHERAL INPUT DEVICE

(75) Inventor: Maria Lucia Garcia, Guadalajara (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 10/051,977

(22) Filed: Jan. 17, 2002

(65) Prior Publication Data

US 2003/0132910 A1 Jul. 17, 2003

(51) Int. Cl.[7] .................................................. G09G 5/08
(52) U.S. Cl. ...................... 345/163; 345/156; 345/160; 273/148 R; 273/148 B; 463/37
(58) Field of Search ................. 345/156–163, 345/166, 169; 273/148 R, 148 B; 463/37; 341/120; 348/734

(56) References Cited

U.S. PATENT DOCUMENTS

| | | | | | |
|---|---|---|---|---|---|
| 5,530,455 | A | * | 6/1996 | Gillick et al. | 345/163 |
| 5,724,106 | A | * | 3/1998 | Autry et al. | 348/734 |
| 5,963,197 | A | * | 10/1999 | Bacon et al. | 345/163 |
| 6,121,957 | A | * | 9/2000 | Yeh et al. | 345/163 |
| 6,137,479 | A | * | 10/2000 | Olsen et al. | 345/169 |
| 6,256,013 | B1 | * | 7/2001 | Siddiqui | 346/163 |
| 6,344,846 | B1 | * | 2/2002 | Hines | 345/166 |
| 6,556,150 | B1 | * | 4/2003 | McLoone et al. | 341/20 |

OTHER PUBLICATIONS

Logitech–Products—by Category—Keyboards [online] [Retrieved on: Aug. 14, 2001] Retrieved from: www.logitech.com/index.cfm?page=products/details&contentid=5013&crid = 1&detail=2&countryid=19&languageid=1.

Microsoft IntelliMouse Explorer—The Product and Technology Catalog [online] [Retrieved on: Aug. 14, 2002] Retrieved from: www.microsoft.com/catalog/display.asp?site=11140&subid=22&pg=2.

Microsoft Trackball Optical—The Product and Technology Catalog [online] [Retrieved on: Aug. 14, 2002] Retrieved from: www.microsoft.com/catalog/display.asp?site=10561&subid=22&pg =2.

Microsoft Wireless Desktop—The Product and Technology Catalog [online] [Retrieved on: Aug. 14, 2002] Retrieved from: www.microsoft.com/catalog/display.asp?site=11081&subid=22&pg=2.

Microsoft Wireless Wheel Mouse—The Product and Technology Catalog [online] [Retrieved on: Aug. 14, 2002] Retrieved from: www.microsoft.com/catalog/display.asp?site=11259&subid=22&pg=2.

* cited by examiner

Primary Examiner—Chanh Nguyen
Assistant Examiner—Srilakshmi K Kumar

(57) ABSTRACT

An enhanced computer peripheral input device is provided. In one embodiment, the enhanced computer peripheral input device comprises a pointing device operable to be communicatively coupled to a computer device. In one embodiment, the pointing device includes at least one control activator, wherein manipulation of the at least one control activator results in the generation and transmission of at least one control signal to at least one electronic device. In a preferred embodiment, the at least one control signal influences the operation of the at least one electronic device. Preferably, the manner in which operation is influenced does not include enabling a user to interact with a graphical user interface being provided at least in part via said computer device, if said computer device is included in said at least one electronic device.

20 Claims, 1 Drawing Sheet

ENHANCED COMPUTER PERIPHERAL INPUT DEVICE

BACKGROUND OF THE INVENTION

1. Technical Field

The present invention relates to electronic devices, and in one aspect to an enhanced computer peripheral input device.

2. Background

Time that an individual could otherwise spend engaged in more valuable pursuits is wasted during the course of a normal day moving to and from one or more electronic devices to turn such devices on or off or to otherwise operate these devices in some manner. For example, in today's society, in the course of one day, typically an individual expends some portion of his or her time walking, reaching, or otherwise moving to and from a computer (e.g., to turn the computer on or off, to insert a disk, to open or close a disk drive, and/or to reset the computer), a monitor (e.g., to turn the monitor on or off, to adjust settings), a printer (e.g., to turn the printer on or off, to manipulate certain printer settings, or to otherwise operate the printer), a copy machine (e.g., to turn the copy machine on or off or to otherwise operate the device), a phone (e.g., to answer the phone), as well as numerous other electronic devices.

Moreover, for some of these devices, once the device is turned on, one or more start-up routines must be completed before the device may be utilized. For example, at start-up, a computer performs a boot-up routine (e.g., a power-on self-test (POST)) before a user is allowed to further operate the computer. Similarly, certain copy machines and printers must perform warm-up routines before they may be further operated by a user. Therefore, in some instances, in addition to the time spent moving to and from a device, additional time is wasted once at the device waiting for the device to complete any necessary start-up routines.

SUMMARY OF THE INVENTION

The present invention is directed to an enhanced computer peripheral input device. In one embodiment, the enhanced computer peripheral input device comprises a pointing device operable to be communicatively coupled to a computer device. In one embodiment, the pointing device includes at least one control activator, wherein manipulation of the at least one control activator results in the generation and transmission of at least one control signal to at least one electronic device. In a preferred embodiment, the at least one control signal influences the operation of the at least one electronic device. Preferably, the manner in which operation is influenced does not include enabling a user to interact with a graphical user interface being provided at least in part via said computer device, if said computer device is included in said at least one electronic device.

DETAILED DESCRIPTION OF THE INVENTION

Figure 1:
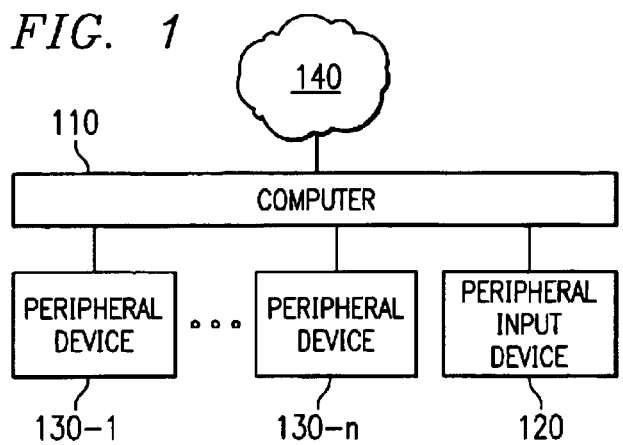
FIG. 1 depicts an exemplary arrangement of a computer device and peripheral devices communicatively coupled thereto.

FIG. 1 depicts an exemplary arrangement of computer device 110 and one or more peripheral devices communicatively coupled thereto (represented in FIG. 1 as peripheral devices 130-1 and 130-n). For the purposes of this disclosure, computer device 110 may be any suitable processor-based device to include a personal computer, personal digital assistant (PDA), client device, server device, etc.

Figure 2:
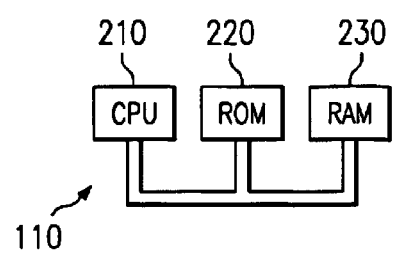
FIG. 2 depicts an exemplary embodiment of a computer device.

An embodiment of computer device 110 is depicted in FIG. 2. In FIG. 2, computer device 110 includes a central processing unit (CPU) 210. CPU 210 may be any general purpose CPU, such as an HPTM PA-8500 or Intel Pentium™ processor. Computer device 110 may include additional CPUs (not shown).

Computer device 110 also includes memory. In a preferred embodiment, CPU 210 is communicatively coupled to read only memory (ROM) 220, which may be PROM, EPROM, or EEPROM. Furthermore, CPU 210 is also preferably coupled to random access memory (RAM) 230, which may be SRAM, DRAM, or SDRAM. ROM 220 and/or RAM 230 of computer device 110 may hold user and system data and programs as is well known in the art.

In addition to the above, computer device 110 includes one or more known means by which peripheral devices 130-1 and 130-n may be communicatively coupled to a computer device. These one or more means for communicatively coupling device 110 to peripheral devices 130-1 and 130-n may include means for wireline and/or wireless communications between computer device 110 and peripheral devices 130-1 and 130-n. For example, computer device 110 may include one or more of a universal serial bus port (USB), a mouse port, a PS2 port, RS 232C port, a keyboard port, a video port, an audio port, a parallel port, a serial port, a sound card, a small computer system interface (SCSI) card, a fibre channel card, an expansion card, an adapter (e.g., an input/output adapter, a communications adapter, a display adapter, a user interface adapter), a wireless transmission and/or receiving port (e.g., an infrared port, an induction coil, a radio frequency(RF) transmitter and/or receiver), a telephone line jack, etc., or some combination thereof.

Moreover, rather than being communicatively coupled to computer device 110 via one of the means discussed above, one or more peripheral devices may instead be connected to a hub(s) (not shown), which itself is communicatively coupled to computer device 110 through one of the above described means. Furthermore, a plurality of peripheral electronic devices may be coupled to computer device 110 by daisy chaining the devices together, with one device in the chain being coupled to computer device 110 (e.g., a SCSI environment).

Moreover, in addition to or in lieu of being communicatively coupled to peripheral devices via ports, cards, adapters, hubs, daisy chains, etc., computer device 110 may be communicatively coupled to data network 140, through which computer device 110 may be communicatively coupled to some combination of the peripheral devices communicatively coupled to network 140. Data network 140 may be any one or combination of numerous known data networks to include the Internet, a local area network (LAN), a metropolitan area network (MAN), a wide area network (WAN), a fibre channel network, an Intranet, etc. Data network 140 may be implemented utilizing any number of communication mediums and protocols, wireline and/or wireless.

Peripheral devices 130-1 and 130-n may be any peripheral device, now known or later developed, that may be communicatively coupled to a computer device. For example, peripheral devices 130-1 and 130-n may be any one or a combination of an external display device (e.g., a monitor or a television), an external audio device (e.g., a microphone, one or more speakers, or some other external sound resource), external memory (e.g., a disk drive (to include compact disk drive), zip drive, tape drive, library, JBOD (Just a Bunch of Disks), a disk array, a mid-range disk array, a high-end disk array, a stacker, a driver, a warehouse), an external modem, an external video device (e.g., a digital camera or other external video source), a global positioning satellite (GPS) receiver, a printing device, a scanning device, a facsimile device, a copy machine, a PDA docking bay, a telephone, a keyboard, a pointing device (e.g., a mechanical mouse, an optical mouse, an opto-mechanical mouse, a foot-controlled mouse, a wireless mouse (i.e., a hamster), a Honeywell™ mouse, a Key Tronic Lifetime Mouse™, a tracker ball, track pad, a touchpad, a trackpoint, a light pen, digitizing tablets (such as those manufactured by Calcomp™ and Wacom™), a data glove, a joystick, a minijoystick, a touch screen), etc.

Also communicatively coupled to computer device 110 in FIG. 1 is enhanced computer peripheral input device 120. Device 120 is, in part, one of the known computer peripheral input devices (e.g., a keyboard, a pointer, a digital camera or other video input device, an audio input device, and/or the like). Accordingly, device 120 is preferably able to provide data (be it spatial, character, audio, graphic, etc.) or otherwise interact with an application(s) graphically interfacing with a user via, at least in part, computer device 110. Preferably, device 120 is, in part, a pointer or a keyboard.

However, in addition to possessing at least some of the structure, hardware and/or capabilities known for computer peripheral input devices, device 120 also possesses the ability to generate and transmit certain control signals to computer device 110 and/or one or more other electronic devices in response to the manipulation of one or more control activators of device 120. In one embodiment, these one or more control activators of device 120 comprise one or more buttons, wheels, toggles, switches, or some combination thereof.

The above-discussed control signals resulting from the manipulation of the control activator(s) of device 120 influence the operation of computer device 110 and/or another electronic device(s) in some manner other than providing data (be it spatial, character, audio, graphic, etc.) or otherwise interacting with an application(s) graphically interfacing with the user, at least in part, through computer device 110 (e.g., an operating system, a word processing application, a spreadsheet application, a web browser application, an e-mail application, a video game, an editor, and/or the like). As a non-limiting example, in one embodiment, the control signals influence the operation of an electronic device(s) (be it device 110 and/or another electronic device(s)) in some manner other than enabling a user to interact with a graphical user interface being provided at least in part via computer device 110.

In one embodiment, the manipulation of a particular control activator of device 120 influences the operation of a particular device. Moreover, preferably the control activators influence the operation of one or more of those devices normally used by an individual in the course of a typical day (e.g., a computer, a monitor, a printer). Furthermore, in a preferred embodiment, a user may configure which device's operation is influenced by a particular control activator.

Device 120 may be communicatively coupled to computer device 110 by any suitable means for communicatively coupling a peripheral device to a computer device. In one embodiment, the means for communicatively coupling device 120 to computer device 110 depends upon the nature of device 120. For example, in one embodiment where device 120 is, in part, a mouse, device 120 is communicatively coupled to computer device 110 via a mouse port or PS2 port of computer device 110. The communicative coupling between computer device 110 and device 120 may be wired, wireless, or some combination thereof.

In some embodiments, the above mentioned one or more other electronic devices to which the earlier mentioned control signals may be transmitted include one or more of the peripheral devices communicatively coupled to computer device 120 (e.g., peripheral devices 130-1 and 130-n). However, in addition or in the alternative, these one or more other electronic devices may include electronic devices not communicatively coupled to computer 110. Such electronic devices may include any electronic device capable of receiving control signals via wireless transmission (e.g., a stereo, a television).

Figure 3:
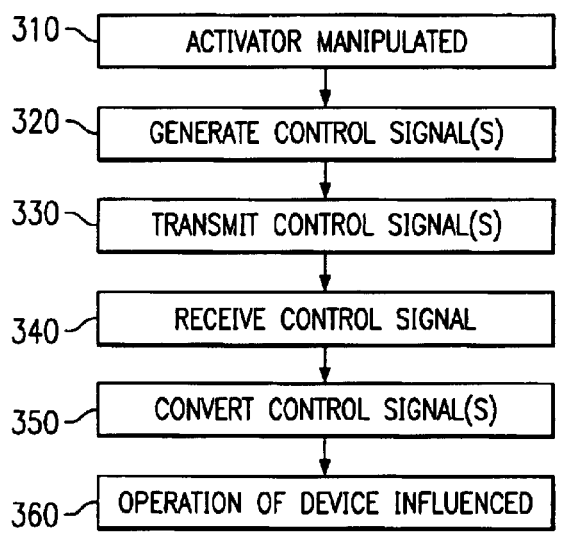
FIG. 3 depicts an exemplary diagram illustrating the interaction between a computer peripheral input device in accordance with the present invention and an electronic device.

A flow diagram illustrating the interaction between an embodiment of device 120 and an electronic device influenced thereby is provided in FIG. 3. As shown, in operation, a user manipulates one or more of the earlier mentioned control activators of device 120 (box 310). In response, device 120 generates one or more of the above discussed control signals (box 320).

The generated control signal(s) are then transmitted by device 120 to an electronic device(s), be it computer device 110 and/or another electronic device(s) (box 330). In one embodiment where a control signal(s) is transmitted to an electronic device(s) other than computer device 110, the control signal(s) may be provided to the electronic device via device 120's communicative coupling to computer device 110, as well as the electronic device's(s') own communicative coupling to computer device 110. In an alternative embodiment, the control signal(s) is provided to the electronic device(s) via a path that does not include computer device 110 (e.g., via a direct wireless transmission to the electronic device). Regardless of the particular path, the transmission of the control signal(s) may be via wireline and/or wireless means.

Eventually, the electronic device(s) receives the transmitted control signal(s) (box 340). Preferably, at the electronic device, if the control signal is not already compatible with some operational aspect of the electronic device(s) (e.g., in an acceptable protocol, format, etc.), a software application at the electronic device(s) converts the control signal into a compatible format (box 350). Once the control signal is in a compatible format, the control signal(s) influences the operation of the electronic device in the intended manner (box 360).

As a non-limiting example of such operational influence, in some embodiments, through manipulating a control activator of device 120, a user turns computer device 110 or another electronic device on or off. In one of these embodiments, device 120 includes a plurality of activators, each one of which may be manipulated to turn on and off a different device. For example, a user may turn computer device 110 on and off by manipulating a first activator of device 120. Similarly, by manipulating another activator of device 120, a user may turn an external display device (e.g., a monitor) communicatively coupled to computer device 110 on and off. Likewise, by manipulating yet another activator of device 120, a user may turn a stereo not communicatively coupled to device 110, but capable of receiving the control signals via wireless transmission, on and off. Moreover, by manipulating still yet another activator of device 120, a user may turn on and off one of a printer, a scanner, a fax machine, a copy machine, an external audio device, an external video device, an external memory device, or any other electronic device that is capable of receiving control signals from an auxiliary device.

Moreover, in one embodiment, manipulation of at least one control activator of device 120 influences the operation of computer device 110 or another electronic device in some manner other than turning on or turning off the device. For instance, a control activator may be manipulated to adjust the volume of an external audio device. Similarly, a control activator may be manipulated to cancel a print job for a printer or bring the printer on- or off-line. Moreover, device 120 may include a control activator that, when manipulated, triggers the speakerphone operations of a telephone, thereby answering the telephone.

In addition, a control activator may be able to influence the operation of computer device 110 or another electronic device in more than one manner. For example, device 120 may include a control activator in the form of a wheel that when depressed turns an external audio device on or off, while rotating the wheel adjusts the volume of the audio device.

Furthermore, more than one control activator of device 120 may influence the operation of the same electronic device. However, it is preferable in such instances that each control activator manipulates a different operational aspect of the device. For example, one control activator may be manipulated to turn a printer on and off, while another control activator may be manipulated to cancel a print job.

Figure 4:
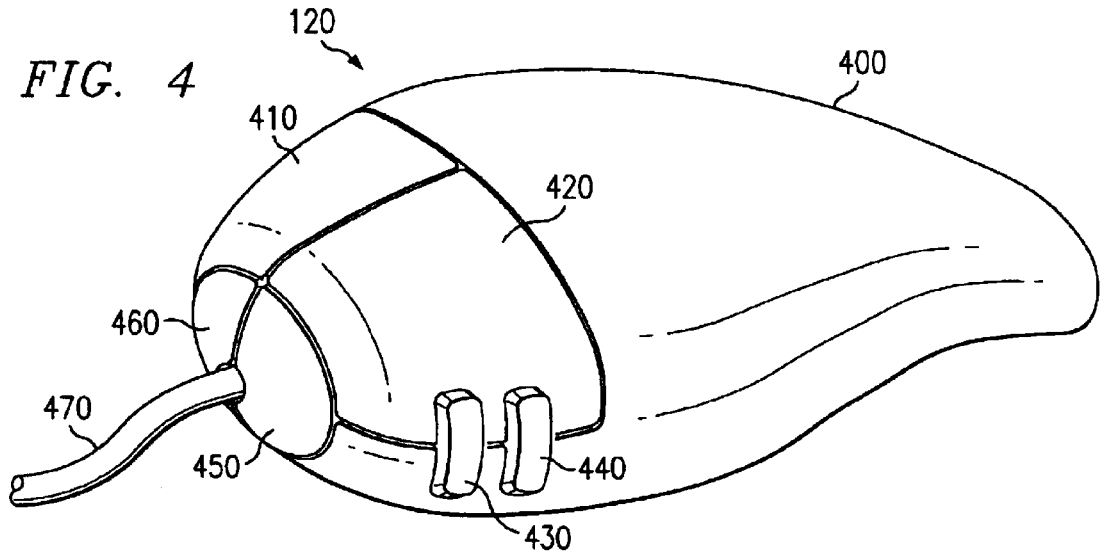
FIG. 4 depicts an exemplary embodiment of a computer peripheral input device in accordance with the present invention.

FIG. 4 provides an exemplary embodiment of device 120. In the embodiment of FIG. 4, device 120 is, in part, a mouse. Accordingly, preferably, device 120 is able to provide data (e.g., spatial data) to an application graphically interfacing with a user, at least in part, via computer device 110. Device 120 may be communicatively coupled to computer device 110 via connector 470.

In addition, device 120 includes casing 400. Casing 400 may be configured for use by the right-hand of a user (in an alternative embodiment, the left-hand). Preferably, casing 400 is ergonomically configured.

In a preferred embodiment, device 120 also includes first application interface button 420. Preferably, button 420 is operable to select, drag, orient, situate and/or activate objects represented on a display device (e.g., a monitor). Device 120 may also include additional application interface buttons (e.g., second application interface button 410). In one embodiment, what may be accomplished with these additional application interface buttons depends upon the particular operating system of computer device 110 and/or other application(s) graphically interfacing with a user, at least in part, via computer device 110. Different operating systems and applications have different conventions for what may be accomplished via such additional application interface buttons. Typical operations include calling up a context-sensitive menu, cutting, copying, or pasting text, modifying a selection, navigating through web pages, etc. In one embodiment, device 120 also includes an application interface wheel (not shown), preferably positioned between buttons 420 and another application interface button, that can be used for scrolling or other special operations defined by an application(s) being executed by computer device 110.

In the illustrated embodiment, device 120 also includes printer control activator 430, copier control activator 440, monitor control activator 450, and PC control activator 460. Although in FIG. 4, activators 430, 440, 450, and 460 are all buttons, as discussed earlier, a control activator may be something other than a button (e.g., a wheel, a toggle, a switch, etc.).

Preferably, depressing activator 430 results in the generation and transmission of a control signal from device 120 to a printer communicatively coupled to computer device 110, as a result of which the printer is turned on or off. In the case of activator 440, depressing activator 440 preferably results in the generation and transmission of a control signal from device 120 to a copy machine communicatively coupled to computer device 110 whereby the copy machine is turned on or off. Similarly, depression of activator 450 preferably causes the generation and transmission of a control signal from device 120 to a monitor communicatively coupled to computer device 110, whereby the monitor is turned on or off. In addition, depression of activator 460 preferably results in the generation and transmission of a control signal from device 120 to computer device 110, whereby computer device 110 is turned on or off.

In one embodiment, one or more of activators 430, 440, 450 and 460 are labeled with identifying indicia. For example, each of activators 430, 440, 450, and 450 may be labeled with a different color. In addition to or alternatively, each of activators 430, 440, 450 and 460 may include a logo identifying the particular device influenced by manipulation of the activator (e.g., a printer graphic may appear on or near activator 430, a copy machine graphic may appear on or near activator 440, a monitor graphic may appear on or near activator 450, and a computer graphic may appear on or near activator 460). In addition to or in lieu of the earlier discussed indicia, each control activator may be labeled with a letter associated with the device affected by the manipulation of the control activator (e.g., the letter "P" may appear on or near activator 430, the letters "CPY" may appear on or near activator 440, the letter "M" may appear on or near activator 450, and the letters "CPU" may appear on or near activator 460).

It will be appreciated by one of ordinary skill in the art that the embodiment of device 120 shown in FIG. 4 is by way of example only for device 120 may have several configurations. For example, device 120 may include a greater or fewer number of control activators than the number depicted in FIG. 2. In addition, manipulation of one of the control activators of device 120 of FIG. 4 may influence the operation of an electronic device in some manner other than turning the device on or off.

Furthermore, rather than each of activators 430, 440, 450, and 460 influencing the operation of different devices, two or more control activators of device 120 may manipulate the same device. However, preferably, in such instances, each control activator manipulates a different operational aspect of the device. In situations where two or more activators influence the operation of the same device, all control activators affecting the same device may be labeled with some indicia indicating such (e.g., the control activators may be labeled with the same color). In one of these embodiments, however, in addition to the common indicia, each control activator may include an additional indicia designating the particular operational aspect of the device that influences the particular activator. For example, all activators affecting the printer may be labeled yellow. However, the activator able to turn the printer on and off may also be labeled with a printer graphic, while a control activator able to cancel print jobs is also labeled with a sheet of paper with a circle and slash imposed over the sheet of paper.

Moreover, activators 430, 440, 450, and 460, as well as other control activators, may be situated at other locations on device 120, to include the under portion of device 120. Preferably, the location of a particular control activator relates to the expected frequency of use of the activator. In addition to or in lieu of the above, the location of a particular control activator may be based, at least in part, on the penalty for accidental manipulation of the control activator. For example, in the embodiment of FIG. 2, PC activator 460 is located at the top of the mouse whereby the chances of accidental depression of activator 460 are greatly reduced, whereas copier activator 440 is located at the left-hand side of device 120 where the chances of accidental depression are slightly higher (the consequences of accidentally turning off computer device 110 normally being greater than the consequences of accidentally turning off a copy machine communicatively coupled thereto).

Furthermore, as discussed earlier, device 120 is not limited to a mouse. For example, in various embodiments, device 120 is, in part, any one of the earlier described computer peripheral input devices. In addition, rather than connector 470, device 120 may be communicatively coupled to computer device 110 through wireless means.

Various embodiments of the present invention alleviate the problems experienced with the prior art by providing a convenient central control device from which numerous electronic devices may be turned on or off or otherwise operated in some manner. Since such actions may be performed from a central location, a user need not waste time walking, reaching, or otherwise moving to and from each device the user desires to operate. In addition, with various embodiments of the present invention, a user may turn on a device substantially in advance of needing to use the device, thereby eliminating the need to wait for the device to complete any start-up routines. Moreover, because the enhanced computer peripheral input device of the present invention is, in part, a peripheral device normally utilized with a computer system (e.g., a keyboard or a mouse), the advantages of a convenient central control device can be enjoyed without the need for an additional device(s) that would occupy or otherwise clutter needed work space. In addition, various embodiments of the present invention enables improved control of a peripheral electronic device(s) coupled to a computer.

In addition, for some embodiments of the present invention, a user of device 120 may quickly turn off a monitor, etc. to protect the integrity of confidential information when an individual who is not authorized to review such confidential information is in viewing distance of such information. Therefore, in such embodiments, the present invention enables the protection of confidential information.

What is claimed is:

1. An enhanced pointing device comprising:
   a pointing device operable to be communicatively coupled to a computer device, wherein said pointing device includes:
      a number of control activators, each activator located on the pointing device in relation to an expected frequency of use, wherein manipulation of at least one control activator results in a generation and transmission of at least one control signal to at least one electronic device, wherein said at least one control signal influences the operation of at least one electronic device, and wherein the influence on operation does not include enabling a user to interact with a graphical user interface being provided at least in part via said computer device, if said computer device is included in said at least one electronic device, and wherein the influence on operation can include enabling a user to interact with at least one electronic device not coupled to the computer device.

2. The enhanced pointing device of claim 1 wherein manipulation of each of said at least one control activator influences the operation of a different device of said at least one electronic device.

3. The enhanced pointing device of claim 1 wherein manipulation of a plurality of said at least one control activator influences the operation of a particular device of said at least one electronic device, and wherein manipulation of each control activator of said plurality influences a different operational aspect of said particular device.

4. The enhanced pointing device of claim 1 wherein the influence on operation includes turning at least one of said at least one electronic device on or off.

5. The enhanced pointing device of claim 1 wherein at least one of said at least one control activator is operable to influence the operation of at least one of said at least one electronic device in more then one manner.

6. The enhanced pointing device of claim 5 wherein said at least one of said at least one control activator is operable to turn said at least one of said at least one electronic device on or off, as well as to adjust the volume of audio provided by said at least one of said at least one electronic device.

7. The enhanced pointing device of claim 1 wherein said pointing device is in part a mouse.

8. The enhanced pointing device of claim 1 wherein said at least one electronic device includes said computer device.

9. The enhanced pointing device of claim 1 wherein said at least one electronic device includes a telephone, and wherein the influence of operation includes answering said telephone.

10. The enhanced pointing device of claim 1 wherein said at least one electronic device includes a copy machine.

11. The enhanced pointing device of claim 1 wherein said at least one electronic device includes a printer.

12. The enhanced pointing device of claim 1 wherein at least one of said at least one control activator is situated at a location on said pointing device whereby the chance of accidental manipulation of said at least one of said at least one control activator is reduced.

13. A method for influencing the operation of at least one electronic device, said method comprising:
   generating at least one control signal in response to manipulation of at least one control activator from among a number of control activators of a pointing device that is operable to be communicatively coupled to a computer device, wherein each of the number of control activators is located on the pointing device in relation to an expected frequency of use and penalty for accidental use; and
   transmitting said at least one control signal to said at least one electronic device;
   wherein said at least one control signal influences the operation of said at least one electronic device, and wherein the influence on operation does not include enabling a user to interact with a graphical user interface being provided at least in part via said computer device, if said computer device is included in said at least one electronic device, and wherein the influence on operation can include enabling a user to interact with at least one electronic device not coupled to the computer device.

14. The method of claim 13 wherein said method further includes converting said at least one control signal into a format compatible with at least one of said at least one electronic device.

15. The method of claim 13 wherein the influence on operation includes turning at least one of said at least one electronic device on or off.

16. An enhanced computer peripheral input device comprising:

an input device that is operable to be communicatively coupled to a computer device, said input device enabling a user to interact with an application graphically interfacing with a user, at least in part, via said computer device, said input device including:

a number of control activators, each activator located on the pointing device in relation to an expected frequency of use and penalty for accidental use, wherein manipulation of at least one control activator results in the generation and transmission of at least one control signal to at least one electronic device, wherein said at least one control signal influences the operation of said at least one electronic device, wherein the influence on operation includes at least one of said at least one electronic device being turned on or off, and wherein the influence on operation does not include interacting with said application and allows interaction with at least one electronic device not coupled to the computer device.

17. The device of claim 16 wherein at least one of said at least one electronic device is said computer device.

18. The device of claim 16 wherein said input device is in part a pointing device.

19. The device of claim 16 wherein said input device is in part a keyboard.

20. The device of claim 16 wherein at least one of said at least one control activator is operable to influence the operation of at least one of said at least one electronic device in more then one manner.

* * * * *